United States Patent
Puckett et al.

(10) Patent No.: US 7,709,599 B2
(45) Date of Patent: May 4, 2010

(54) COMPOUNDS, ROSINS, AND SIZING COMPOSITIONS

(75) Inventors: Garry D. Puckett, Salisbury, NC (US); Brian Woodworth, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 816 days.

(21) Appl. No.: 11/386,898

(22) Filed: Mar. 22, 2006

(65) Prior Publication Data

US 2007/0079730 A1    Apr. 12, 2007

Related U.S. Application Data

(60) Provisional application No. 60/726,012, filed on Oct. 12, 2005.

(51) Int. Cl.
C09F 1/04 (2006.01)
C08L 93/04 (2006.01)
C09D 193/04 (2006.01)

(52) U.S. Cl. .............. 530/214; 106/218; 428/375; 428/378

(58) Field of Classification Search ............. 106/218; 530/214; 428/375, 378
See application file for complete search history.

(56) References Cited

U.S. PATENT DOCUMENTS

| | | | |
|---|---|---|---|
| 2,653,142 A * | 9/1953 | Cody et al. ............ 530/217 |
| 2,723,215 A | 11/1955 | Biefeld et al. |
| 3,437,517 A | 4/1969 | Eilerman et al. |
| 3,997,306 A | 12/1976 | Hedden |
| 4,049,597 A | 9/1977 | Motsinger |
| 4,110,094 A | 8/1978 | Motsinger |
| 4,305,742 A | 12/1981 | Barch et al. |
| 4,536,447 A | 8/1985 | Hsu |
| 4,637,956 A | 1/1987 | Das et al. |
| 4,808,478 A | 2/1989 | Dana et al. |
| 4,810,576 A | 3/1989 | Gaa et al. |
| 5,242,958 A | 9/1993 | Klett et al. |
| 5,248,562 A | 9/1993 | Palermo et al. |
| 5,466,528 A | 11/1995 | Girgis |
| 5,552,519 A | 9/1996 | Hemmings et al. |
| 5,670,255 A | 9/1997 | Temple et al. |
| 5,747,162 A | 5/1998 | Temple et al. |
| 5,804,313 A | 9/1998 | Schell |
| 5,824,413 A | 10/1998 | Schell |
| 5,872,067 A | 2/1999 | Meng et al. |
| 5,883,021 A | 3/1999 | Beer et al. |
| 5,883,023 A | 3/1999 | Martine et al. |
| 5,908,689 A | 6/1999 | Dana et al. |
| 5,910,458 A | 6/1999 | Beer et al. |
| 6,042,035 A | 3/2000 | Grobler et al. |
| 6,228,496 B1 | 5/2001 | Lawton et al. |
| 6,283,164 B1 | 9/2001 | Parks |
| 6,372,842 B1 | 4/2002 | Grisso et al. |
| 6,564,437 B2 | 5/2003 | Meng et al. |
| 6,593,255 B1 | 7/2003 | Lawton et al. |
| 6,635,341 B1 | 10/2003 | Barancyk et al. |
| 6,770,705 B2 | 8/2004 | Vanier et al. |
| 6,809,046 B2 | 10/2004 | Velpari et al. |
| 7,291,390 B2 | 11/2007 | Puckett |
| 2002/0051882 A1 | 5/2002 | Lawton et al. |
| 2002/0058140 A1 | 5/2002 | Dana et al. |
| 2002/0058449 A1 | 5/2002 | Velpari et al. |
| 2002/0085888 A1 | 7/2002 | Velpari et al. |
| 2002/0086598 A1 | 7/2002 | Velpari et al. |
| 2002/0123285 A1 | 9/2002 | Dana et al. |
| 2002/0193027 A1 | 12/2002 | Dana et al. |
| 2004/0225057 A1 | 11/2004 | Anderson et al. |
| 2005/0100734 A1 | 5/2005 | Puckett |

FOREIGN PATENT DOCUMENTS

EP    1 457 466 A2    9/2004
JP    A 59-170165    *  9/1984

OTHER PUBLICATIONS

PCT Search Report, corresponding to PCT/US2004/034474, mailed on Apr. 25, 2005.
PCT Search Report, corresponding to PCT/US2006/039911, mailed on Feb. 6, 2007.
Akzo Nobel—Eka Chemicals, Inc., Material Safety Data Sheet for Dynakoll Si 100, available at http://www.ekamsds.com, pp. 1-5.
Database WPI, Section Ch. Week 197940, Derwent Publications Ltd., London, GB; An 1979-72365B, XP002321642 & JP 54 106627 A (Asahi Glass Co. Ltd) Aug. 21, 1979 abstract.
Loewenstein, K., The Manufacturing Technology of Glass Fibres, (3d Ed. 1993) at pp. 30-44, 47-60, 115-122, and 126-135.
PCT Written Opinion of the International Searching Authority for International Application No. PCT/US2006/039911.
Other Information—Disclosure of Compound (Proprietary Material Not Open to Public. To Be Opened Only by Examiner or Other Authorized US Patent & Trademark Office Employee).

* cited by examiner

*Primary Examiner*—David M Brunsman
(74) *Attorney, Agent, or Firm*—Andrew C. Siminerio

(57) ABSTRACT

The present invention relates to terpene derivative compounds and rosins and sizing compositions comprising such compounds. Compounds of Formula (I) are disclosed in addition to rosins and sizing compositions comprising compounds of Formula (I). Fiber glass strands comprising a plurality of glass fibers at least partially coated with sizing compositions comprising compounds of Formula (I) are also disclosed.

20 Claims, No Drawings

COMPOUNDS, ROSINS, AND SIZING COMPOSITIONS

CROSS REFERENCE TO RELATED APPLICATION

This application claims priority to, and incorporates by reference in full, the following application of Applicant: U.S. Provisional Patent Application No. 60/726,012, filed Oct. 12, 2005, entitled "Compounds, Rosins, and Sizing Compositions."

FIELD OF INVENTION

The present invention relates to terpenoid compounds and rosins comprising terpenoid compounds. Some embodiments of terpenoid compounds and rosins comprising terpenoid compounds of the present invention can find application in sizing compositions operable to at least partially coat fibers such as glass fibers.

BACKGROUND OF THE INVENTION

Diterpenoids are a class of compounds found in wood extractives of many tree species and can be generally grouped into two subclasses comprising abietanes and pimeranes. Abietane-type acids have an isopropyl chain at the C-13 position while primerane-type acids have methyl and vinyl substituents at this position. Wood extractives comprising abietane and primerane acids can comprise natural rosins.

Several different types of natural rosins exist, including wood rosins, gum rosins, and tall oil rosins. Wood, gum, and tall oil rosins, however, are produced by various processes. Wood rosins, for example, are produced via a multistage purification and refining process involving solvent extraction of pine wood chips followed by solvent-solvent refining of the crude rosin extract. Gum rosins, nevertheless, are generally produced by a single stage flash distillation process wherein the terpene (turpentine) fraction is volatilized leaving the rosin as a bottoms product. Tall oil rosins are the by-products of the fractionation of tall oil.

Although produced by varying processes, these natural rosins have similar components. Wood rosins and gum rosins, for example, comprise similar abietane and pimarane contents. Gas chromatographic analysis reveals that wood and gum rosins comprise various percentages of diterpenoid acids, such as pimaric acid, isopimaric acid, palustric acid, abietic acid, dehydroabietic acid, and neoabietic acid, in addition to other contents.

Natural rosins comprising wood rosins, gum rosins, and tall oil rosins are useful in a variety of applications. Natural rosins, for example, are used in binders for inks, tackifying resins, and pressure sensitive adhesives.

In some circumstances, natural rosins can be modified to demonstrate various physical and chemical properties. Modification of natural rosins can be accomplished through chemical modification of rosin components. Diterpenoid acid components of wood and gum rosins as delineated above, for example, can be chemically modified to produce chemically modified rosins. As used herein, a chemically modified rosin is defined as a rosin in which one or more components of the rosin has been chemically reacted. Chemically modified rosins are useful in a number of applications including paper production processes and sizings for natural and synthetic fibers. One area in which chemically modified rosins and natural rosins find application is in the treatment of glass fibers.

Various chemical treatments exist for glass-type surfaces such as glass fibers to facilitate their processability as well as their interaction with other substances or media. In glass fiber applications, a coating composition or sizing composition is applied to at least a portion of individual glass filaments to protect the filaments from abrasion and to assist in processing of the filaments. As used herein, the terms "sizing composition," "sizing," "binder composition," "binder," or "size" refer to a coating composition applied to glass filaments or glass fibers. Sizing compositions may provide protection through subsequent processing steps, such as those where the fibers pass by contact points in the winding of the fibers and strands onto a forming package, drying the aqueous-based or solvent based sizing composition to remove the water or solvent, twisting from one package to a bobbin, chopping in a wet or dry condition, roving into larger bundles or groups of strands, unwinding for use as a reinforcement, and other downstream processes.

In addition, sizing compositions can play a dual role when placed on fibers that reinforce polymeric matrices in the production of fiber-reinforced plastics. In such applications, the sizing composition provides protection and also can provide compatibility between the fiber and the matrix polymer or resin. Glass fibers, for example, in the forms of woven and nonwoven fabrics and mats and rovings have been used with various matrices, such as thermosetting and thermoplastic resins, as reinforcing components. In such applications, it can be desirable to produce favorable interfacial interactions between the glass fiber and the polymer matrix while also facilitating processing and manufacturing considerations.

Sizing compositions can contain a variety of chemical species wherein each of the individual chemical species performs one or more functions. A sizing composition, for example, may comprise film forming agents that facilitate spreading of the sizing composition across the glass surface to ensure homogenous coating. Sizing compositions can also comprise coupling agents which promote favorable interaction of a glass surface with various matrices. In addition to film forming and coupling agents, sizing compositions can comprise various ionic or non-ionic lubricants, biocides, antistatic agents, antifoaming agents, and/or wetting agents.

Diterpenoid compounds and natural and chemically modified rosins comprising such compounds can provide a number of desirable characteristics when coated on a glass fiber. Disadvantages under some circumstances currently exist, however, with some diterpenoid compounds and related rosins comprising these compounds. Diterpenoid derivatives and related rosins, for example, can be expensive and difficult to manufacture.

It would be desirable to provide other terpenoid compounds and derivatives and rosins comprising such compounds and derivatives. It would additionally be desirable to provide sizing compositions comprising such terpenoid compounds and derivatives.

SUMMARY

Embodiments of the present invention comprise a diterpenoid derivative compound of Formula I.

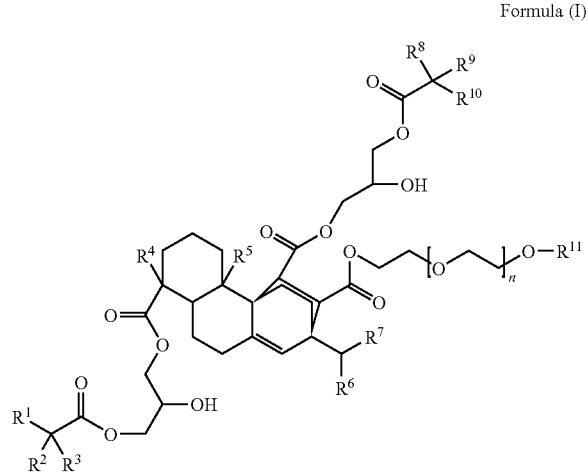

Formula (I)

wherein $R^1$, $R^2$, $R^3$, $R^4$, $R^5$, $R^6$, $R^7$, $R^8$, $R^9$, $R^{10}$, and $R^{11}$ are the same or different and are independently selected from the group consisting of:
(a) hydrogen,
(b) alkyl,
(c) alkenyl,
(d) alkynyl,
(e) alkoxy,
(f) thioalkyl,
(g) $NH_2$,
(h) alkyl-amine,
(i) alkenyl-amine,
(j) amide,
(k) hydroxyl,
(l) alkyl-OH
(m) alkenyl-OH
(n) COOH,
(o) alkyl-COOH, and
(p) alkenyl-(COOH)

wherein n is an integer ranging from 1 to 180.

As used herein, the terms "alkyl," "alkenyl," and "alkynyl," are meant to encompass straight chain and branched structures. The term "alkoxy" is meant to encompass any —OR group wherein R is alkyl, alkenyl, or alkynyl as defined above. The term "thioalkyl" is meant to encompass an alkyl group having at least one sulfur atom wherein alkyl has the definition provided above. Moreover, terms "alkyl amine" and "alkenyl amine" are intended to encompass primary, secondary, and tertiary amines wherein alkyl and alkenyl have the definitions provided above. The chemical nomenclature used herein is meant to be interpreted by one of skill in the art, and, therefore, any deviations and combinations of this type of nomenclature is also within the abilities of those of skilled in the art to interpret. Accordingly, this type of nomenclature is not to be applied to combinations that would result in an unrealistic molecule or substituent.

In some embodiments, the present invention provides rosins comprising compounds of Formula (I). Rosins comprising compounds of Formula (I) can also comprise compounds found in natural rosins and/or compounds found in chemically modified rosins.

In some embodiments, the present invention provides a sizing composition comprising a compound of Formula (I). In some embodiments, a sizing composition of the present invention comprises a chemically modified rosin comprising a compound of Formula (I). In some embodiments, a sizing composition of the present invention can further comprise a natural rosin.

The present invention additionally provides glass fibers at least partially coated with a sizing composition comprising a compound of Formula (I). Moreover, the present invention provides fiber glass strands that comprise at least one glass fiber at least partially coated with a sizing composition comprising a compound of Formula (I). Coated glass fibers and fiber glass strands of the present invention can be used in a variety of applications including, without limitation, screens, tapes, flooring products, aviation composite materials, aerospace composite materials, fabrics for machines applications, window shades, braided products, scrim fabrics, filters, and others.

Glass fibers and fiber glass strands coated with a sizing composition comprising a compound of Formula (I) can advantageously be compatible with a variety of different resins, thermosetting resins, and other resins. In some embodiments, glass fibers and fiber glass strands coated with sizing compositions of the present invention can additionally exhibit desirable physical characteristics. Non-limiting examples of such physical characteristics can include an acceptable number of broken filaments, desirable abrasion resistance, desirable air drag, desirable strand integrity, or desirable strand friction. Glass fibers and fiber glass strands coated with sizing compositions of the present invention do not necessarily possess each or any of the foregoing physical characteristics, although some embodiments of sizing compositions coated on glass fibers and fiber glass strands can provide one or more of these characteristics. Various physical characteristics can be important depending on the end use application and the processing required to use glass fibers and fiber glass strands in such applications.

These and other embodiments of the present invention are described in greater detail in the detailed description of the invention which follows.

DETAILED DESCRIPTION

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

Further, when the phrase "up to" is used in connection with an amount of a component, material, or composition in the claims, it is to be understood that the component, material, or composition is present in at least a detectable amount (e.g., its presence can be determined) and may be present up to and including the specified amount.

Embodiments of the present invention relate to compounds of Formula (I) as set forth above, wherein $R^1$, $R^2$, $R^3$, $R^4$, $R^5$, $R^6$, $R^7$, $R^8$, $R^9$, $R^{10}$, and $R^{11}$ are the same or different and are independently selected from the group consisting of:
(a) hydrogen,
(b) alkyl,
(c) alkenyl,
(d) alkynyl,
(e) alkoxy,
(f) thioalkyl,
(g) $NH_2$,
(h) alkyl-amine,
(i) alkenyl-amine,
(j) amide,
(k) hydroxyl,
(l) alkyl-OH
(m) alkenyl-OH
(n) COOH,
(o) alkyl-COOH, and
(p) alkenyl-(COOH)

wherein n is an integer ranging from 1 to 180.

In some embodiments, the present invention comprises compounds of Formula (I) wherein $R^1$, $R^2$, $R^3$, $R^4$, $R^5$, $R^6$, $R^7$, $R^8$, $R^9$, $R^{10}$, and $R^{11}$ are the same or different and are independently selected from the group consisting of:
(a) hydrogen, and
(b) alkyl.

In some embodiments, the present invention comprises compounds of Formula (I), wherein $R^4$, $R^5$, $R^6$, $R^7$, and $R^{11}$ are methyl groups and $R^1$, $R^2$, $R^3$, $R^8$, $R^9$, and $R^{10}$ are the same or different and are independently selected from the group consisting of:
(a) hydrogen,
(b) alkyl,
(c) alkenyl,
(d) alkynyl,
(e) alkoxy,
(f) thioalkyl,
(g) $NH_2$,
(h) alkyl-amine,
(i) alkenyl-amine,
(j) amide,
(k) hydroxyl,
(l) alkyl-OH
(m) alkenyl-OH
(n) COOH,
(o) alkyl-COOH, and
(p) alkenyl-(COOH)

In some embodiments, the present invention comprises compounds of Formula 1, as set forth above, wherein $R^1$, $R^2$, $R^3$, $R^4$, $R^5$, $R^6$, $R^7$, $R^8$, $R^9$, $R^{10}$, and $R^{11}$ are the same or different and are independently selected from the group consisting of:
(a) hydrogen,
(b) alkyl,
(c) alkenyl,
(d) alkynyl,
(e) alkoxy,
(f) thioalkyl,
(g) $NH_2$,
(h) alkyl-amine,
(i) alkenyl-amine,
(j) amide,
(k) hydroxyl,
(l) alkyl-OH
(m) alkenyl-OH
(n) COOH,
(o) alkyl-COOH, and
(p) alkenyl-(COOH)

wherein n is an integer selected from the ranges provided in Table I below.

TABLE I

Ranges for n in Compounds of Formula I
RANGE 1-180
1-120
1-100
1-50
1-30
5-50
8-30

General considerations for selecting a value for n can include achieving acceptable water-dispersability properties of compounds of Formula (I) as well as providing desirable film forming properties. In some embodiments, larger values of n, for example, can increase the hydrophilic character of some compounds of Formula (I) thereby increasing their water-dispersability.

The following is an example of a reaction mechanism for synthesis of some embodiments of compounds of Formula (I):

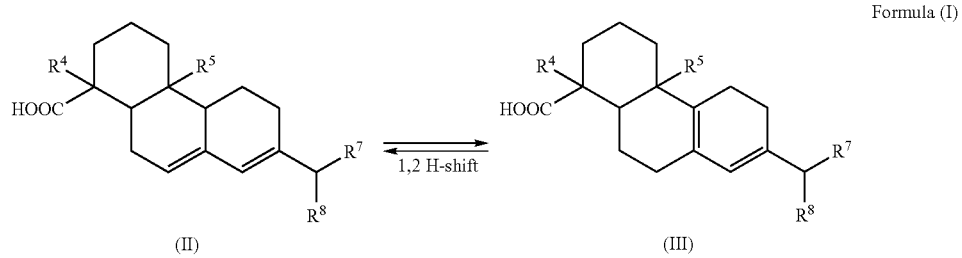

Formula (I)

-continued

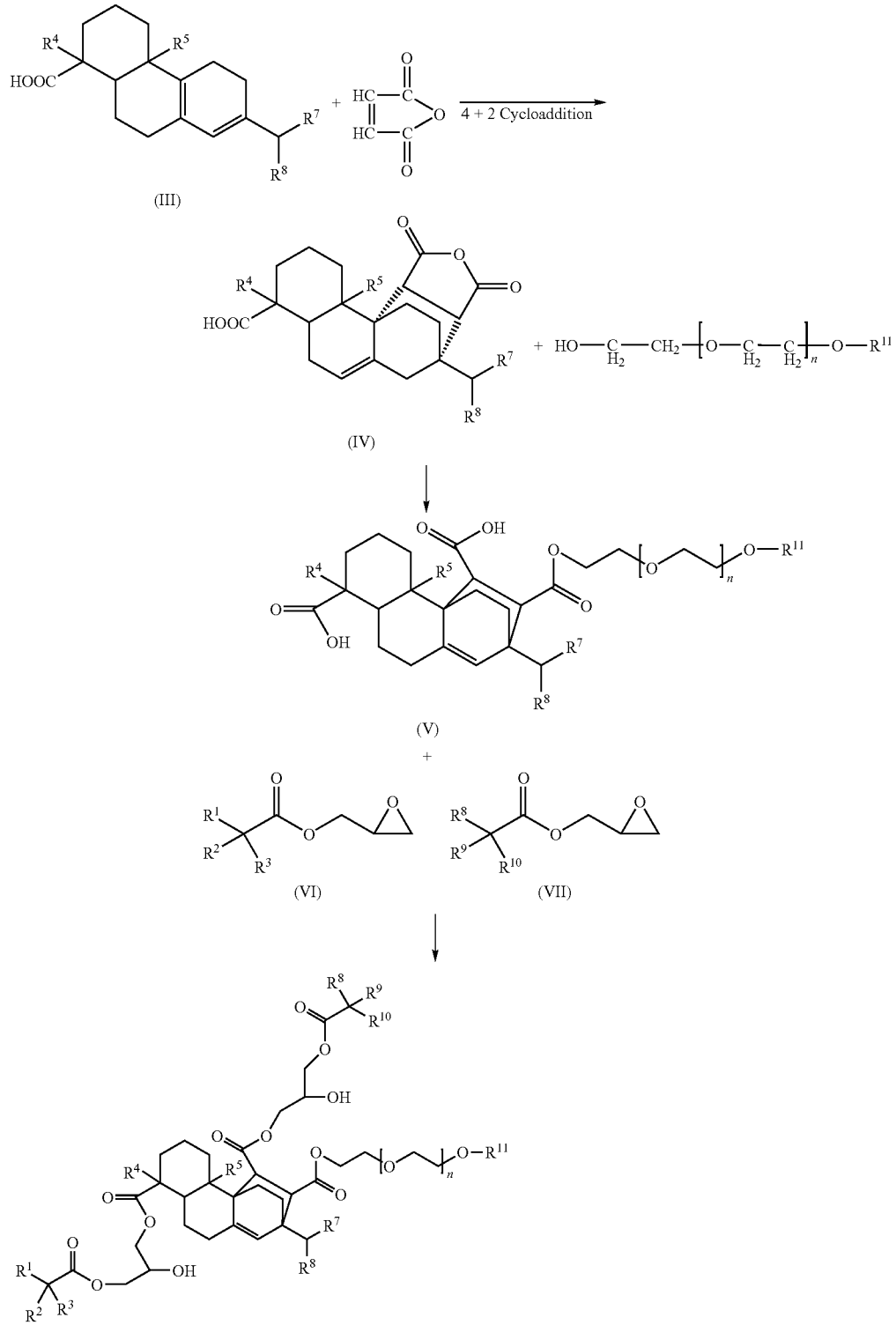

Abietic acid of formula (II) undergoes a 1,2 hydrogen shift to provide a compound of formula (III). The compound of formula (III) can be subsequently reacted with maleic anhydride or a suitable dienophilic derivative thereof, in a [4+2] cycloaddition reaction (Diels-Alder reaction) to produce compound (IV).

In some embodiments, the anhydride moiety of compound (IV) can be esterified with a polyethylene glycol or an alkoxylated polyethylene glycol, including monoalkoxylated polyethylene glycols such as (MPEG), of suitable molecular weight. Molecular weights for polyethylene glycols and alkoxylated polyethylene glycols that can be used in some embodiments of the present invention are provided in Table II below. As with the n values discussed above in connection with Table I, similar considerations can be important in selecting a molecular weight of polyethylene glycols or alkoxylated polyethylene glycols that can be used to synthesize some embodiments of compounds of the present invention. Table II is a list of exemplary ranges.

TABLE II

Molecular Weight Ranges for Polyethylene Glycols and Alkoxylated Polyethylene Glycols for the Synthesis Compounds of Formula I
MOLECULAR WEIGHT RANGES*

| |
| --- |
| 300-8000 |
| 300-4600 |
| 300-3000 |
| 300-1500 |
| 300-1000 |
| 300-750 |

*g/mol

In some embodiments, polypropylene glycols and poly(1,4 butanediols) having molecular weights similar to those listed in Table II are suitable for esterifying the anhydride moiety of compound (IV). In some embodiments, carbitol [2-(2-ethoxyethoxy)-ethanol] and carbitol derivatives, such as butyl carbitol (diethylene glycol monobutyl ether), are suitable for esterifying the anhydride moiety of compound (IV). Some embodiments of the present invention additionally contemplate various other diols and polyols suitable for esterifying the anhydride moiety of compound (IV).

The esterification of the anhydride moiety yields compound (V). Compound (V) can be reacted with two equivalents of a glycidyl ester (VI), (VII) in ring opening reactions to produce a compound of Formula (I). In some embodiments of the present invention, glycidyl esters (VI), (VII) in the synthetic scheme above can be the same or different. In some embodiments, glycidyl esters can comprise alkyl glycidyl esters such as glycidyl stearate, glycidyl butyrate, and glycidyl neodecanoate as well as alkenyl glycidyl esters such as glycidyl methacrylate, and derivatives thereof. In some embodiments, glycidyl esters comprising phenyl or aryl moieties, such as glycidyl cinnamate, glycidyl benzoate, glycidyl-4-tert-butyl benzoate, and derivatives thereof, might be used. Conversely, in other embodiments, glycidyl esters used in esterification might not include glycidyl esters comprising phenyl or aryl moieties.

In some embodiments of the present invention, the starting compound (II) in the synthetic scheme above can comprise palustric acid, 7-oxopalustric acid, and/or 7-oxo-11,12-dihydroxy-8,13-abietadien acid. Moreover, in some embodiments, the dienophile in the [4+2] cycloaddition reaction can comprise maleic acid, itaconic acid, or fumaric acid.

In embodiments of the present invention, the reaction sequence provided above can yield reaction products in addition to those of Formula (I). In some embodiments, for example, the anhydride moiety can be di-esterified with a polyethylene glycol producing a compound having two polyethylene glycol chains. The resulting compound may further react with one equivalent of glycidyl ester at the remaining free carboxylic acid functionality. In some embodiments, the anhydride moiety can be di-esterified with any combination of suitable esterification chemical species provided above.

Embodiments of compounds of Formula (I) can exhibit a wide range of physical and chemical properties facilitating their use in many applications, including, without limitation, sizing compositions. In some embodiments of the present invention, physical and chemical properties of compounds of Formula (I) can be varied and/or tailored according to the chemical identities of $R^1$-$R^{11}$. In some applications, for example, compounds with hydrophobic properties may be desirable. In some embodiments of the present invention, the hydrophobicity of a compound of Formula (I) may be increased by selecting the identity of any and/or all of the substituents $R^1$-$R^{11}$ to comprise hydrophobic chemical species such as alkyl, alkenyl or alkynyl groups. In some embodiments, alkyl, alkenyl, and alkynyl groups comprising extensive chain branching or increased numbers of carbon atoms may be chosen to increase the hydrophobic character of compounds of Formula (I). The hydrophobicity of compounds of Formula (I) may additionally be increased by selecting smaller values for n resulting in shorter polyethylene glycol chains.

Similarly, in some applications, compounds with hydrophilic properties may be desirable. In some embodiments of the present invention, the hydrophilicity of compounds of Formula (I) may be increased by selecting the identity of any and/or all of the substituents $R^1$-$R^{11}$ to comprise more hydrophilic chemical species such as alkoxy groups, alkyl-amines, alkenyl-amines, amides, hydroxyl, alkyl-OH, alkenyl-OH, carboxyl, alkyl-COOH, and/or alkenyl-COOH. The hydrophilicity of compounds of Formula (I) may additionally be increased by selecting larger values for n resulting in longer polyethylene glycol chains.

In some applications, compounds with both hydrophobic and hydrophilic properties may be desirable. In some embodiments, compounds of Formula (I) may be produced having hydrophobic regions and hydrophilic regions. In one embodiment, for example, substituents $R^1$-$R^3$ can be selected from hydrophobic chemical species while substituents $R^8$-$R^{10}$ can be selected from more hydrophilic chemical species or vice versa. In some embodiments, substituents $R^1$-$R^3$ and $R^8$-$R^{10}$ can be selected from hydrophobic chemical species, such as alkyl, alkenyl or alkynyl groups, and a value of n can be chosen to produce a polyethylene glycol chain with increased hydrophilicity. Alternatively, substituents $R^1$-$R^3$ and $R^8$-$R^{10}$ can be chosen from hydrophilic chemical species, such as alkoxy groups, alkyl-amines, alkenyl-amines, amides, hydroxyl, alkyl-OH, alkenyl-OH, carboxyl, alkyl-COOH, and/or alkenyl-COOH, and a value of n can be selected to produce a more hydrophobic polyethylene glycol.

In embodiments of the present invention, the chemical identity of each substituent, $R^1$-$R^{11}$, is independently selected and there are no requirements of substituent symmetry in compounds of Formula (I). In some embodiments, for example, substituents $R^1$-$R^3$ are not collectively identical to or symmetrical with substituents $R^8$-$R^{10}$. Moreover, in some embodiments, compounds of Formula (I) do not comprise an aryl ether or phenyl ether moiety. In some embodiments, compounds of Formula (I) do not comprise an aryl or phenyl substituent or moiety.

In some embodiments, at least one substituent, $R^1$-$R^{11}$, can comprise an alkyl, alkenyl, alkynyl, or alkoxy group. In some embodiments, alkyl, alkenyl, alkynyl, and alkoxy groups can comprise up to 20 carbon atoms in straight chain and/or branched structures. In some embodiments, at least one of $R^1$-$R^{11}$ is an alkyl, alkenyl, alkynyl, or an alkoxy group comprising up to 20 carbon atoms. While it is contemplated that that alkyl, alkenyl, alkynyl, and alkoxy groups of the present invention can comprise greater than 20 carbon atoms, exceeding this number may result in reduced aqueous solubility properties. In some embodiments of the present invention where aqueous solubility is not applicable, alkyl, alkenyl, alkynyl, and alkoxy groups can comprise greater than 20 carbon atoms.

In some embodiments alkyl, alkenyl, alkynyl, and alkoxy groups comprise at least 10 carbon atoms in straight chain and/or branched structures. In some embodiments, at least one of $R^1$-$R^{11}$ is an alkyl, alkenyl, alkynyl, or an alkoxy group comprising at least 10 carbon atoms.

In some embodiments, alkyl, alkenyl, alkynyl, and alkoxy groups comprise at least 6 carbon atoms in straight chain and/or branched structures. In some embodiments, at least one of $R^1$-$R^{11}$ is an alkyl, alkenyl, alkynyl, or an alkoxy group comprising at least six carbon atoms.

In some embodiments, alkyl, alkenyl, alkynyl, and alkoxy groups comprise 1 to 10 carbon atoms in straight chain and/or branched structures. In some embodiments, at least one of $R^1$-$R^{11}$ is an alkyl, alkenyl, alkynyl, or an alkoxy group comprising 1 to 10 carbon atoms.

In some embodiments of the present invention, alkyl, alkenyl, alkynyl, and alkoxy groups comprise between 10 and 20 carbon atoms in straight chain and/or branched structures. In some embodiments, at least one of $R^1$-$R^{11}$ is an alkyl, alkenyl, alkynyl, or an alkoxy group comprising 10 to 20 carbon atoms.

In some embodiments, alkyl, alkenyl, alkynyl, and alkoxy groups comprise between 6 and 10 carbon atoms in straight chain and/or branched structures. In some embodiments, at least one of $R^1$-$R^{11}$ is an alkyl, alkenyl, alkynyl, or an alkoxy group comprising 6 to 10 carbon atoms.

In some embodiments alkyl, alkenyl, alkynyl, and alkoxy groups comprise between 1 and 6 carbon atoms in straight chain and/or branched structures. In some embodiments, at least one of $R^1$-$R^{11}$ is an alkyl, alkenyl, alkynyl, or an alkoxy group comprising 1 to 6 carbon atoms.

In some embodiments, alkyl and alkenyl groups having up to 20 carbon atoms may further comprise at least one nitrogen atom producing alkyl-amines and alkenyl amines. Similarly, alkyl and alkenyl groups having up to 20 carbon atoms may further comprise at least one sulfur atom producing thioalkyl and thioalkenyl groups. In some embodiments, alkyl and alkenyl groups having up to 20 carbon atoms may further comprise at least one carboxyl functionality (COOH) producing alkyl-COOH and alkenyl-COOH. Moreover, alkyl and alkenyl groups having up to 20 carbon atoms may further comprise at least one hydroxyl functionality producing alkyl-OH and alkenyl-OH.

Some embodiments of the present invention comprise rosins comprising compounds of Formula (I). Rosins comprising compounds of Formula (I) can further comprise compounds found in natural rosins and compounds found in other chemically modified rosins. For example, rosins comprising compounds of Formula (I) can be mixed with natural rosins and/or other chemically modified rosins in some embodiments. In some embodiments, compounds of Formula (I) can be added to natural rosins. In some embodiments, abietane components of natural rosins can be chemically modified to produce chemically modified rosins comprising compounds of Formula (I). In some embodiments, compounds of Formula (I) can be added to other chemically modified rosins, wherein the addition of the compounds of Formula (I) does not accord the rosin its chemically modified classification.

Compounds of Formula (I) can have a number of uses. One example of a use of compounds of Formula (I) is in the coating of glass fibers as part of a sizing composition. As noted earlier, compounds of Formula (I) can be part of a rosin or a mixture of rosins in some embodiments and the rosin can be used in sizing compositions for glass fibers. Compound of Formula (I) as well as rosins comprising compounds of Formula (I) can be combined with other components to form a sizing composition as known to those of skill in the art.

As used herein, the term "sizing composition" refers to a coating composition applied to fiber glass filaments and may be used interchangeably with the terms "binder composition," "binder," "sizing," and "size." In one non-limiting embodiment, a sizing composition of the present invention can be compatible with a large number of resins, including thermosetting resins, thermoplastic resins, and other polymeric resins. In one non-limiting embodiment, sizing compositions of the present invention are useful on fiber glass to be used in polyvinyl chloride (PVC) coating applications.

As noted above, in some embodiments, compounds of Formula (I) can be combined with other components to produce a sizing composition of the present invention. Additional components, in some non-limiting embodiments, can comprise one or a plurality of coupling agents, cationic lubricants, anionic lubricants, non-ionic lubricants, biocides, antistatic agents, anti-foaming agents, and wetting agents. Examples of coupling agents, lubricants, biocides, antistatic agents, antifoaming agents, wetting agents, and other components and amounts thereof, operable to be mixed with compounds of Formula (I) to produce sizing compositions according to some embodiments of the present invention are set forth in United States Patent Publication No. 2005/0100734A1, which is hereby incorporated by reference in its entirety. Compounds of Formula (I), or rosins comprising compounds of Formula (I), can be used as the rosin in the sizing compositions described in Publication No. 2005/0100734A1 to comprise some embodiments of sizing compositions of the present invention. In some embodiments, compounds of Formula (I), or rosin comprising compounds of Formula (I), can be used in combination with other rosins described in Publication No. 2005/0100734A1 to form various embodiments sizing compositions of the present invention.

In some embodiments, natural rosins and/or chemically modified rosins comprising compounds of Formula (I) can be combined with other components to produce some embodiments of sizing composition of the present invention. Natural and/or chemically modified rosins comprising compounds of Formula (I), for example, can be mixed with coupling agents, lubricants, and/or other components to form some embodiments of sizing compositions of the present invention.

Some embodiments of the present invention can additionally provide glass fibers and fiber glass strands at least partially coated with sizing compositions comprising compounds of Formula (I). Moreover, some embodiments of the present invention can provide fiber glass strands that can comprise at least one glass fiber at least partially coated with a sizing composition comprising a compound of Formula (I). While some embodiments of the present invention will be discussed generally in the context of their use in the production, assembly, and application of glass fibers, one of ordinary skill in the art would understand that the present invention can be useful in various coatings and in the processing of other textile materials.

Persons of ordinary skill in the art will recognize that some embodiments of the present invention can be implemented in the production, assembly, and application of a number of glass fibers. Non-limiting examples of glass fibers suitable for use in the present invention can include those prepared from fiberizable glass compositions such as "E-glass", "A-glass", "C-glass", "S-glass", "ECR-glass" (corrosion resistant glass), and fluorine and/or boron-free derivatives thereof. Typical formulations of glass fibers are disclosed in K. Loewenstein, *The Manufacturing Technology of Continuous*

Glass Fibres, (3d Ed. 1993). Some embodiments of the present invention can be particularly useful in the production, assembly, and application of glass fibers prepared from E-glass compositions.

Various embodiments of fiber glass strands of the present invention can have one or more desirable properties. For example, non-limiting embodiments of fiber glass strands can be at least partially coated with a sizing composition comprising a compound of Formula (I) that can result in the at least partially coated fiber glass strand being compatible with a number of resins while exhibiting desirable levels of broken filaments, desirable abrasion resistance, desirable strand integrity, desirable strand friction, or other properties, as well as various combinations thereof. The desired level of a particular property may depend on the application or end use. For example, relatively low strand friction may be desirable for some applications with a large number of contact points.

In some embodiments, fiber glass strands comprise at least one glass fiber at least partially coated with a sizing composition of the present invention. The formation of fiber glass strands and the application of sizing compositions to glass fibers are generally known to those of skill in the art. Additional information regarding the formation of fiber glass strands and the application of sizing compositions to glass fibers can be found in paragraphs [0074]-[0080] of United States Patent Publication No. 2005/0100734A1, which is hereby incorporated by reference. This excerpt also sets forth various, exemplary characteristics of fiber glass strands (e.g., number of filaments per strand, filament diameters, LOI, etc.) according to some embodiments of the present invention.

Some embodiments of fiber glass strands at least partially coated with sizing compositions of the present invention can advantageously be compatible with a variety of resins based in part on the sizing composition. Embodiments of sizing compositions of the present invention which utilize a plurality of different silanes can assist in facilitating this multi-resin compatibility. Non-limiting examples of thermosetting resins with which the sizing compositions of the present invention may be compatible include diallyl phthalates, cycloaliphatic epoxides, epoxies, furans, melamines, phenolics, polybutadienes, polyester, crosslinked polyethylenes, and polyimides. Non-limiting examples of thermoplastic resins with which the sizing compositions of the present invention may be compatible include nylon, polycarbonate, polybutylene terephthalate, polyethylene, polypropylene, polyvinyl chloride, polyvinyl chloride plastisol, and urethane. Non-limiting examples of other polymeric resins with which the sizing compositions of the present invention may be compatible include acrylics, cellulosics, neoprenes, nitriles, nitrocelluloses, polyamides, polyethers, polyolefins, polysulfides, polyurethanes, polyvinyl butyral, silicone, styrene-butadiene, urea-formaldehyde, and vinyls.

Due to the compatibility of the sizing compositions and the fiber glass strands of the present invention, the fiber glass strands can be used in a wide range of applications including, for example, screens, tapes, flooring products, aviation composite materials, aerospace composite materials, fabrics for marine applications, window shades, braided products, scrim fabrics, filters, and others. Such products can be formed from fiber glass strands of the present invention using techniques known to those of ordinary skill in the art.

Some embodiments of the present invention will now be illustrated in the following specific, non-limiting examples.

EXAMPLE 1

Synthesis of a Species of Formula (I)

A species of Formula (I) was prepared by chemically modifying abietane components of a natural rosin. 50 grams of maleic anhydride were added to a solution of 200 grams of Planebras Gum Rosin, available from BFB Enterprises, Inc., Panama City Beach Fla. The gum rosin and maleic anhydride were reacted at 180° C. for three hours under nitrogen. The temperature of the reaction mixture was subsequently cooled to 150° C. where 375 grams of a methoxypolyethylene glycol having a molecular weight of about 750 g/mol, such as CARBOWAX™ MPEG 750 available from Dow Chemical of Midland, Mich., and 1 gram of KOH were added to the reaction mixture. The reaction mixture was then raised to 200° C. The resulting reaction mixture was maintained under nitrogen. The reaction mixture was cooled to 140° C. and 150 grams of a glycidyl neodecanoate, such as Cardura E-10P from Resolution Performance Products, was added to the reaction mixture. After addition of the glycidyl ester, the temperature of the reaction mixture increased to 190° C. The reaction temperature was brought to 200° C. and kept at 200° C. for one hour. The result of this synthesis is a chemically modified rosin. One of the reaction products in the chemically modified rosin is the following compound of Formula (VIII):

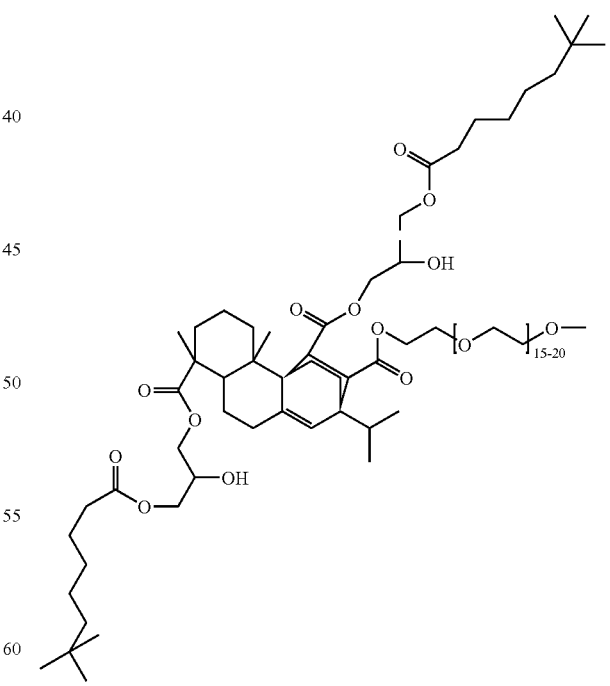

Formula (VIII)

It is to be understood that the amounts of reactants and solvents in the synthesis described above can be varied within the skill of one in the art. Moreover, the synthesis of compounds of Formula (I) is not limited to that described above as the foregoing procedure is an example of one synthetic route according to one embodiment of the present invention.

EXAMPLE 2

Sizing Composition Comprising a Compound of Formula (VIII)

The chemically modified rosin of Example 1 comprising a compound of Formula (VIII) was combined with additional chemical species delineated in Table III to produce a sizing composition according to one embodiment of the present invention.

TABLE III 30-gallon Formulation

| Component | Amount | | % of Solids |
|---|---|---|---|
| Water | 3.0 | gallons | 0% |
| for Rosin | | | |
| Rosin[1] | 5510 | grams | 80% |
| Hot Water for Lubricant | 0.5 | gallons | 0% |
| Lubricant[2] | 343 | grams | 5% |
| Cold Water for First Silane | 0.5 | gallons | 0% |
| Acetic Acid[3] | 31 | grams | 0% |
| First Silane[4] | 269 | grams | 4% |
| Cold Water for Second Silane | 0.5 | gallons | 0% |
| Acetic Acid[5] | 31 | grams | 0% |
| Second Silane[6] | 269 | grams | 4% |
| Cold Water for Third Silane | 0.5 | gallons | 0% |
| Acetic Acid[7] | 15 | grams | 0% |
| Third Silane[8] | 138 | grams | 2% |
| Wax[9] | 1491 | grams | 5% |
| Defoamer[10] | 46 | grams | 0.1% |
| Biocide[11] | 1.5 | grams | 0% |
| Total Solids = | | | 100.0% |

[1]Chemically modified rosin from Example 1.
[2]EMERY 6717 partially amidated polyethylene imine from Cognis Corporation of Cincinnati, Ohio.
[3]Generic glacial acetic acid.
[4]A-174 gamma-methacryloxypropyltrimethoxysilane from OSi Specialties of Tarrytown, NY.
[5]Generic glacial acetic acid.
[6]A-187 gamma-glycidoxypropyltrimethoxysilane from OSi Specialties of Tarrytown, NY.
[7]Generic glacial acetic acid.
[8]A-1100 gamma-aminopropyltriethoxysilane from OSi Specialties of Tarrytown, NY.
[9]Protolube HDA high density polyethylene wax from Bayer Corporation of Pittsburgh, PA.
[10]SAG 10 defoamer, which is a silicon-based antifoam emulsion from OSi Specialties of Tarrytown, NY.
[11]CL-2141 biocide, which is a water-based MBT (methylene-bis-thiocyanate) from ChemTreat Inc.

A sizing composition comprising the ingredients in Table III may be prepared by first adding water (at approximately 60° F.-80° F.) for the rosin to a premix bucket and beginning agitation. The rosin was then added to the water and agitated for ten minutes to disperse the rosin. The rosin was then transferred to a main mix tank.

Hot water for the lubricant was then added to a premix bucket with agitation. The lubricant was added to the hot water and agitated for ten minutes to disperse the lubricant. The lubricant dispersion was then added to the main mix tank.

For the first silane, cold water was first added to a premix bucket and agitation was begun. The acetic acid was then added to the cold water with agitation. The A-174 silane was then added to the acidified cold water and agitated for five minutes or until the solution was clear-blue in color. The first silane solution was then transferred to the main mix tank.

For the second silane, cold water was first added to a premix bucket and agitation was begun. The acetic acid was then added to the cold water with agitation. The A-187 silane was then added to the acidified cold water and agitated for five minutes or until the solution was clear. The second silane solution was then transferred to the main mix tank.

For the third silane, cold water was added to a premix bucket and agitation was begun. The acetic acid was then added to the cold water with agitation. The A-1100 silane was then added to the acidified cold water and agitated for five minutes or until the solution was clear. The third silane solution was then transferred to the main mix tank.

The wax, defoamer, and the biocide were then sequentially added to the main mix tank. Cold water was added to the main mix tank to dilute the sizing composition to a final volume of thirty (30) gallons. The main mix tank was agitated for ten minutes. The sizing composition had a total percent solids of 8.0% and a pH of 4.5.

It is to be understood that the present invention is not limited to the sizing composition described above. Sizing compositions of the present invention comprising compounds of Formula (I) and chemically modified rosins comprising compounds of Formula (I) can comprise a variety of different silanes, coupling agents, lubricants, waxes, defoamers, biocides, etc. depending on the desired end use of the sizing composition. The sizing composition described above is a example of one embodiment of a sizing composition of the present invention.

Desirable characteristics, which can be exhibited by the present invention, include, but are not limited to, the provision of compounds of Formula (I) that are readily available and less costly to produce than other terpene compounds; the provision of natural rosins and chemically modified rosins comprising compounds of Formula (I); the provision of sizing compositions comprising a compounds of Formula (I) that can have improved compatibility with a variety of resins; the provision of fiber glass strands coated with a sizing composition that can have improved compatibility with a variety of resins; the provision of sizing compositions that can reduce the number of broken filaments observed during the manufacture of fiber glass strands; the provision of fiber glass strands that can exhibit reduced broken filaments during manufacture; the provision of fiber glass strands comprising a plurality of glass fibers coated with a sizing comprising a chemically modified rosin wherein the glass strands are compatible with a wide variety of resins for encapsulation, impregnation, reinforcement, or coating; the provision of fiber glass strands that can exhibit reduced broken filaments during downstream processing; the provision of a sizing composition, that upon at least partially coating fiber glass strand, can result in the fiber glass strand exhibiting improved frictional properties; the provision of fiber glass strands that can exhibit improved frictional properties; the provision of fiber glass strands coated with a sizing composition that can pay out more consistently resulting in fewer breakouts; the provision of fiber glass strands coated with a sizing composition that can demonstrate improved resistance to abrasion during manufacture and downstream processing; the provision of fiber glass strands coated with a sizing composition that can exhibit high strand integrity; the provision of sizing compositions that can reduce the costs of manufacturing fiber glass strands; the provision of fiber glass strands coated with a sizing composition that can exhibit adequate tensile strengths; the provision of fiber glass strands coated with a sizing composition that can improve productivity during downstream processing; and others.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

That which is claimed is:

1. A compound of the formula:

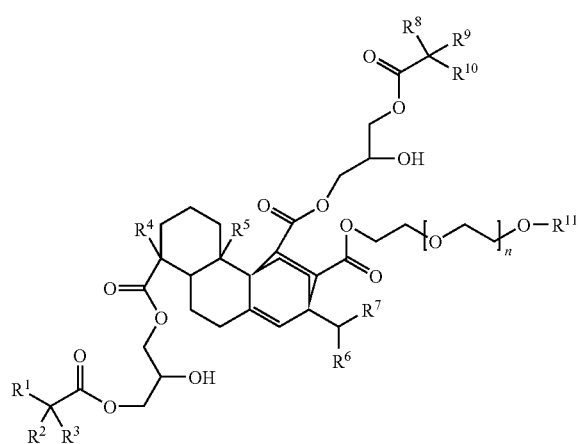

wherein
$R^1, R^2, R^3, R^4, R^5, R^6, R^7, R^8, R^9, R^{10}$, and $R^{11}$ are the same or different and selected from the group consisting of:
(a) hydrogen,
(b) alkyl,
(c) alkenyl,
(d) alkynyl,
(e) alkoxy,
(f) thioalkyl,
(g) $NH_2$,
(h) alkyl-amine,
(i) alkenyl-amine,
(j) amide,
(k) hydroxyl,
(l) alkyl-OH
(m) alkenyl-OH
(n) COOH,
(o) alkyl-COOH, and
(p) alkenyl-(COOH)
wherein n is an integer ranging from 1 to 180.

2. The compound of claim 1, wherein n is an integer ranging from 8 to 30.

3. The compound claim 1, wherein $R^4, R^5, R^6, R^7$, and $R^{11}$ are methyl groups.

4. The compound of claim 1, wherein at least one of $R^1$-$R^{11}$ is an alkyl, alkenyl, alkynyl, or alkoxy group.

5. The compound of claim 1, wherein at least one of $R^1$-$R^{11}$ is an alkyl, alkenyl, alkynyl, or alkoxy group comprising up to 20 carbon atoms.

6. The compound of claim 1, wherein at least one of $R^1$-$R^{11}$ is an alkyl, alkenyl, alkynyl, or alkoxy group comprising at least six carbon atoms.

7. The compound of claim 1, wherein at least one of $R^1$-$R^{11}$ is an alkyl, alkenyl, alkynyl, or alkoxy group comprising at least 10 carbon atoms.

8. The compound of claim 1, wherein at least one of $R^1$-$R^{11}$ is an alkyl, alkenyl, alkynyl, or alkoxy group comprising 10 to 20 carbon atoms.

9. The compound of claim 1, wherein at least one of $R^1$-$R^{11}$ is an alkyl, alkenyl, alkynyl, or alkoxy group comprising 6 to 10 carbon atoms.

10. The compound of claim 1, wherein the compound does not comprise an aryl ether group.

11. A rosin comprising the compound of claim 1.

12. The rosin of claim 11, wherein the rosin further comprises a natural rosin.

13. The rosin of claim 11, wherein the rosin further comprises a second chemically modified rosin.

14. A sizing composition comprising the compound of claim 1.

15. A sizing composition comprising a rosin comprising the compound of claim 1.

16. The sizing composition of claim 15, wherein the rosin comprises a natural rosin or a chemically modified rosin.

17. The sizing composition of claim 15, wherein the rosin comprises a chemically modified rosin.

18. The sizing composition of claim 17, further comprising a natural rosin.

19. A fiber glass strand comprising at least one glass fiber at least partially coated with a sizing composition comprising the compound of claim 1.

20. A fiber glass strand comprising at least one glass fiber at least partially coated with a sizing composition comprising a rosin comprising the compound of claim 1.

* * * * *